Feb. 9, 1932.    E. F. ROSSMAN    1,844,795
SHOCK ABSORBER
Filed Dec. 16, 1929
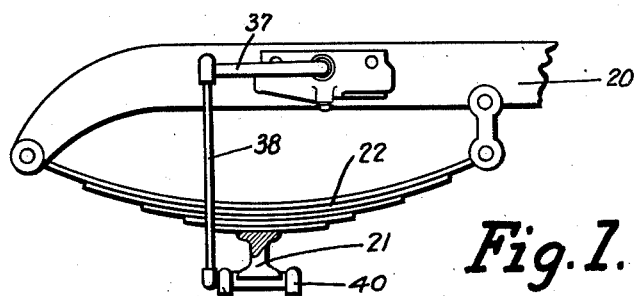
Fig. 1.
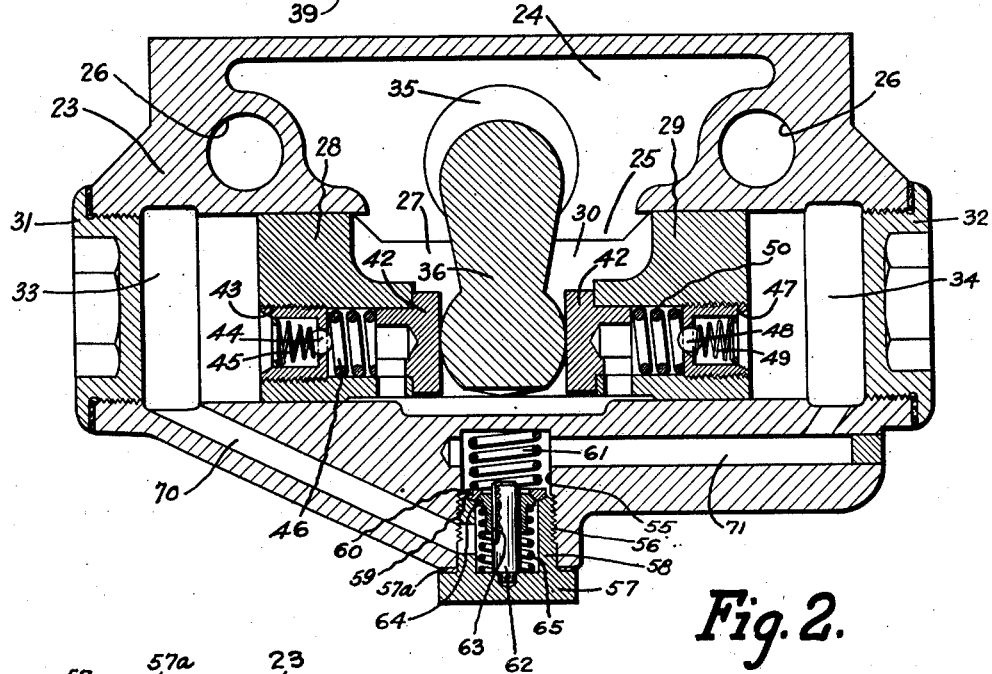
Fig. 2.
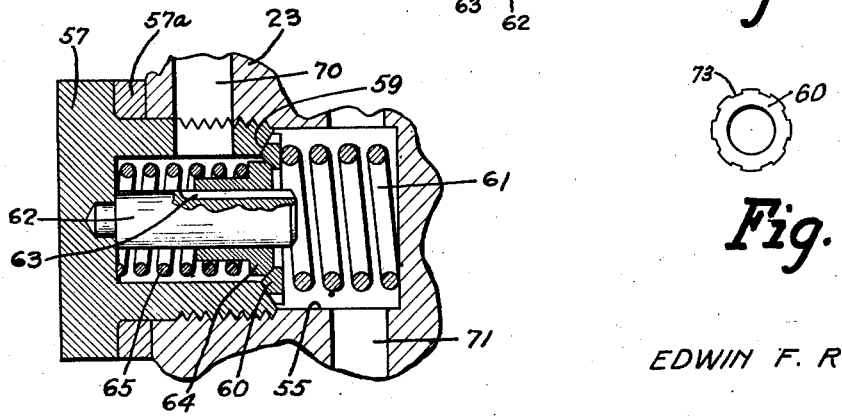
Fig. 3.
Fig. 4.
Inventor
EDWIN F. ROSSMAN Patented Feb. 9, 1932

1,844,795

UNITED STATES PATENT OFFICE

EDWIN F. ROSSMAN, OF DAYTON, OHIO, ASSIGNOR TO DELCO PRODUCTS CORPORATION, OF DAYTON, OHIO, A CORPORATION OF DELAWARE

SHOCK ABSORBER

Application filed December 16, 1929. Serial No. 414,355.

This invention relates to improvements in shock absorbers for motor vehicles.

It is among the objects of the present invention to provide a shock absorber of simple structure and design, adapted to control both the compression and rebound movements of vehicle springs.

Another object of the invention is to provide a shock absorber with a simple and efficient pressure release device, adapted to control the fluid flow within the shock absorber whereby the compression and rebound movements of the vehicle springs will be properly resisted.

Further objects and advantages of the present invention will be apparent from the following description, reference being had to the accompanying drawings wherein a preferred embodiment of one form of the present invention is clearly shown.

In the drawings:

Fig. 1 is a fragmentary side view of a vehicle chassis with a shock absorber equipped with the present invention applied thereto. For the sake of clearness, the road wheels supported on the vehicle axle are not shown in this view.

Fig. 2 is a longitudinal sectional view taken through the center of the shock absorber.

Fig. 3 is a fragmentary sectional view, on an enlarged scale, illustrating the pressure release device of the shock absorber.

Fig. 4 is a detail plan view of the ring-shaped valve of the pressure release device.

Referring to the drawings, the numeral 20 designates the frame of the vehicle which is supported on the axle 21 by vehicle springs 22, which are hingedly secured to the frame 20 in any suitable manner.

The shock absorber comprises a casing 23, presenting a fluid reservoir 24 and a cylinder 25. The casing 23 has apertures 26 for receiving bolts or studs by which the shock absorber is secured to the frame 20 of the vehicle.

Within the cylinder 25 there is provided a fluid displacement member or piston 27, comprising two head portions 28 and 29 forming two pistons bound together by an intermediate web portion 30. One end of the cylinder 25 is closed by a screw plug 31, a similar screw plug 32 closing the opposite end of the cylinder. Both these screw plugs 31 and 32 are properly gasketed so as to prevent fluid leaks. The piston head portion 28 forms the compression chamber 33 in this end of the cylinder, while a similar compression chamber 34 is formed between the piston head portion 39 and the cylinder end cover 32.

Bearings in the casing 23 support a rocker shaft 35, said rocker shaft having a rocker arm 36 provided thereon inside the casing 23. The rocker shaft 35 extends outside of the casing and has the shock absorber operating arm 37 provided thereon, the free end of which is swivelly attached to one end of a link rod 38, the other end of said link rod being swivelly secured to the member 39 anchored to the axle 20 by the clamping member 40. Each piston head portion 28 and 29 has a wear piece 42, said wear pieces each having shank portions extending into passages formed in the respective piston head portions. The outer surfaces of the wear pieces 42 are adapted to be engaged by the rocker arm 36. The piston head portion 28 has a valve cage 43 screw-threaded into the one end of its passage, said valve cage having a ball check valve 44 maintained against a valve seat provided in the valve cage 43 by a spring 45. A spring 46 is interposed between the valve cage 43 and the wear piece 42, said spring yieldably urging the wear piece 42 into engagement with the one side of the rocker arm 36 whereby wear of either the wear piece or the rocker arm will be compensated for. A similar valve cage 47 is provided in the outer end of the passage in the piston head portion 29, said cage having a ball check valve 48 maintained in engagement with its seat by a spring 49. A spring 50 between the valve cage 47 and the wear piece 42 in the piston head 29 yieldably urges said wear piece into engagement with the rocker arm 36, thus wear between this wear piece 42 and the rocker arm will be compensated for. Both valves 44 and 48 are fluid replenishing valves, that is, valve 44 may replenish the fluid supply in the chamber 33 as the piston moves toward the right, and valve 48 may replenish the fluid supply in chamber 34 as the piston moves toward the left as regards Fig. 2.

In the casing 23 there is provided a valve chamber 55, at the outer end of which are screw-threads 56. A plug 57 has a cylindrical extension 58 which is screw-threadedly received by the screw-threaded portion 56 of the valve chamber, a gasket 57a between the head of the plug 56 and the casing preventing fluid leaks at this point. The inner edge 59 of the cylindrical extension provides a valve seat with which a ring-shaped valve 60 is adapted to engage. This valve 60 is maintained in engagement with the valve seat 59 by a spring 61 interposed between the valve 60 and the end wall of the valve chamber 55.

The plug 56 supports a pin 62 which extends coaxially into and through the cylindrical extension 58. As shown in the Fig. 2, pin 62 has a longitudinal channel 63. Upon the pin 62 there is slidably supported a valve 64 having a head portion adapted to engage with and seat upon the inner peripheral edge of the valve 60. A spring 65 interposed between the plug and the valve 64 yieldably urges the valve 64 into engagement with the ring valve 60, which acts as a seat for the valve 64. Compression chamber 33 is connected or communicates with the interior of the cylindrical extension 58 of the plug 56 through a passage or duct 70, said passage communicating with a lateral aperture in the cylindrical portion 58. A similar duct or passage 71 provides communication between the compression chamber 34 and the valve chamber 55, this communication of the duct 71 with said valve chamber being on the side of the ring valve 60 opposite the valve 64.

As will be seen in Fig. 4, valve 60 is provided with notches or serrations 73 whereby fluid passage past the valve is assured, while portions of said valve may engage the inner wall of the fluid chamber and be guided thereby.

It may be said here that the spring 61 is preferably stiffer or of greater tension than the spring 65 which urges valve 64 to engage valve 60.

The operation of the device is as follows:

The road wheels (not shown) in striking an obstruction in the roadway, will cause springs 22 to be flexed toward the frame 20, thus the link rod 38 connected to the axle 21 which in turn is secured to springs 22, will move the shock absorber operating arm 37 in a clockwise direction, thus causing clockwise rotation of the rocker arm 36. This results in a movement of the fluid displacement member 30 toward the left as regards Fig. 2 and consequently the fluid from the reservoir 24 causes valve 48 to replenish any fluid loss occasioned in the fluid or compression chamber 34. This movement of the piston head portion 28 to the left as regards Fig. 2 will exert a pressure upon the fluid within the compression chamber 33, forcing it through the duct 70 into the interior of the cylindrical extension 58 of the plug 56 from where the fluid will flow through the longitudinal passage 63 in the pin 62, into the fluid chamber portion with which passage 71 is in communication. Flowing through the passage 71, the fluid will enter into the compression chamber 34, the cubical contents of which is being enlarged upon movement of the piston 29 toward the left. The flow of fluid from duct 70 to duct 71 through the longitudinal passage 73 in the pin will be restricted and thus the movement of the fluid displacement member 30 toward the left as regards Fig. 2 will be resisted, resulting in a resistance to the flexing of the springs 22 toward the frame 20. If the obstruction met causes the fluid displacement member 30 to exert sufficient pressure upon the fluid within the compression chamber 33, said pressure not being able to be relieved by the flow through the longituidinal passage 63 in the pin 62, then this excessive pressure, being directed against the valves 60 and 64, the latter forming a part of the valve 60 in this instance, will move said valve 60 against the effect of its spring 61 from the valve seat 59 and thus there will be established an additional flow of fluid from the interior of the cylindrical extension 58 past the valve 60 into the valve chamber and thence through duct 71 into the compression chamber 44. This fluid flow is also restricted, causing a resistance to the movement of the spring toward the frame 20 in response to the striking of sufficiently large obstructions in the roadway.

As soon as the springs 22 have reached the limit of their flexure caused by the particular obstruction being met, their tendency is to return to normal, unflexed position with a sudden, rebounding movement which, if not resisted, will result in uncomfortable jars and jolts being transmitted to the body of the vehicle supported on the frame 20.

The present device resists also the movement of the springs 22 toward unflexed position for, as the springs 22 begin to move away from the frame 20, the link rod 38 will cause a counter-clockwise movement of the arm 37, resulting in a similar rotation of the rocker arm 36 and consequently the fluid displacement member 30 will be moved toward the right as regards Fig. 2. In this instance valve 44 may become effective to replenish the fluid supply within the compression chamber 33. Piston head portion 29 moving toward the right exerts pressure upon the fluid in the compression chamber 34, causing it to flow through the duct 71 into the valve chamber 55 and thence through the longitudinal passage 63 in the pin 62 into the interior of the cylindrical extension 58 from whence it will pass through the duct 70 and into compression spring 33. As before, passage 63 restricts the flow of fluid and consequently resists the return movement of the springs 22. If the pressure within the chamber 34 is excessive, however, then valve 64 will be moved from engagement with the valve 60, acting as its valve seat, and a flow will then be established from the valve chamber 55 through the valve 60 past the valve 64 into the interior of the cylindrical extension 58 and then, as before, through duct 70 into the compression chamber 33.

The present invention provides a shock absorber having a pressure release device comprising two valves, one of which in one instance acts as a valve seat for the other and in another instance the last mentioned valve forms the main body portion of the first mentioned valve.

Such a valve construction substantially reduces the number of parts usually provided in the compound pressure release valve adapted to control fluid flow in two opposite directions. The valve structure is so constructed and designed that it may be assembled easily and quickly and may readily be removed to replace the original springs with other springs of greater or lesser tension whereby comparatively greater or lesser effective resistance of the shock absorber to the movement of the vehicle springs is obtained.

While the form of embodiment of the present invention as herein disclosed, constitutes a preferred form, it is to be understood that other forms might be adopted, all coming within the scope of the claims which follow.

What is claimed is as follows:

1. A shock absorber adapted to control the approaching and separating movements of two relatively movable members, comprising in combination, a casing presenting a cylinder and a fluid reservoir; a fluid displacement member in the cylinder forming a compression chamber at each end thereof; ducts in the casing connecting the two compression chambers; and a compound pressure release device interposed between said ducts for controlling the flow of fluid in both directions through said ducts, said device comprising two oppositely acting valves, the one acting as a seat for the other.

2. A shock absorber adapted to control the approaching and separating movements of two relatively movable members, comprising in combination, a casing presenting a cylinder and a fluid reservoir; a fluid displacement member in the cylinder forming a compression chamber at each end thereof; ducts in the casing connecting the two compression chambers; and a compound pressure release device interposed between said ducts for controlling the flow of fluid in both directions through said ducts, said device comprising two oppositely acting valves, the one acting as a seat for the other, while the last mentioned valve forms a part of the first mentioned one when it is functioning to control fluid flow.

3. A shock absorber adapted to control the approaching and separating movements of two relatively movable members, comprising in combination, a casing presenting a cylinder and a fluid reservoir; a fluid displacement member in the cylinder forming a compression chamber at each end thereof; a valve chamber in the casing; ducts leading from the respective compression chambers to the valve chamber; and a compound pressure release device in said valve chamber, comprising two oppositely acting spring-loaded valves adapted to cooperate to restrict the flow of fluid in either direction between the two compression chambers.

4. A shock absorber adapted to control the approaching and separating movements of two relatively movable members, comprising in combination, a casing presenting a cylinder and a fluid reservoir; a fluid displacement member in the cylinder forming a compression chamber at each end thereof; ducts in the casing connecting the two compression chambers; and a compound pressure release device interposed between said ducts for controlling the flow of fluid in both directions through said ducts, said device comprising two oppositely acting valves, the one providing the seat for the other, the latter forming the main body portion of which the former is the head of the valve.

5. A shock absorber adapted to control the approaching and separating movements of two relatively movable members, comprising in combination, a casing presenting a cylinder and a fluid reservoir; a fluid displacement member in the cylinder forming a compression chamber at each end thereof; a valve chamber in the casing; ducts leading from the respective compression chambers to the valve chamber; and a compound pressure release device in said valve chamber, comprising a sleeve member slidably supported by the casing, a ring member, an annular valve seat provided by the casing; springs yieldably urging the ring member upon the annular valve seat and the sleeve member into engagement with the ring member, whereby the ring member forms a seat for the sleeve member and the sleeve member the main body portion of the ring member.

6. A shock absorber adapted to control the approaching and separating movements of two relatively movable members, comprising in combination, a casing presenting a cylinder and a fluid reservoir; a fluid displacement member in the cylinder forming a compression chamber at each end thereof; a valve chamber in the casing; a plug having a cylindrical extension fitting into said valve chamber; a stem carried by the plug, said stem extending coaxially into the cylindrical extension thereof; a sleeve slidably carried by the stem; a ring member; a spring yieldably urging the ring member into engagement with the end of the cylindrical extension of the plug; a spring yieldably urging the sleeve into engagement with the ring; and ducts connecting the respective compression chambers with the interior of the cylindrical extension of the plug and the valve chamber on the side of the ring member, opposite the sleeve, respectively.

7. A shock absorber adapted to control the approaching and separating movements of two relatively movable members, comprising in combination, a casing presenting a cylinder and a fluid reservoir; a fluid displacement member in the cylinder forming a compression chamber at each end thereof; a valve chamber in the casing; a plug in said valve chamber, said plug having a recess opening into said chamber; a pin in the plug coaxial of the recess; a longitudinal channel in said pin; a sleeve valve slidably carried by the pin; a ring valve in the valve chamber; a coil spring engaging the ring valve to urge it into seating engagement with the annular wall of the recessed plug; a coil spring engaging the sleeve valve, yieldably urging it to engage the ring valve; and ducts connecting the separate compression chambers with the recess in the plug and the valve chamber on the side of the ring valve, opposite the sleeve valve respectively.

8. A shock absorber comprising in combination, a casing presenting a fluid reservoir and a cylinder; a piston in said cylinder forming a compression chamber at each end of the cylinder; a valve chamber in the casing; a duct connecting the one end of the valve chamber with one compression chamber; a duct connecting the other end of said valve chamber with the other compression chamber; an annular valve seat within said valve chamber; and two spring loaded, oppositely acting valves in said chamber, one being ring shaped and engaging the annular valve seat, the other normally seating upon the ring shaped valve.

9. A shock absorber comprising in combination, a casing presenting a fluid reservoir and a cylinder; a piston in said cylinder forming a compression chamber at each end of the cylinder; a valve chamber in the casing; a duct connecting the one end of the valve chamber with one compression chamber; a duct connecting the other end of said valve chamber with the other compression chamber; an annular valve seat within said chamber, intermediate the ducts opening thereinto; a ring-shaped valve adapted to seat upon the annular valve seat; a valve adapted to act oppositely to the aforementioned valve and normally being seated upon said valve; a spring urging the ring-shaped valve into engagement with the annular valve seat; and a spring of lesser tension than the aforementioned spring urging the other valve into engagement with the ring-shaped valve.

In testimony whereof I hereto affix my signature.

EDWIN F. ROSSMAN.